(12) United States Patent
DSouza et al.

(10) Patent No.: US 12,447,978 B2
(45) Date of Patent: Oct. 21, 2025

(54) TUNABLE FILTERS FOR SIGNAL INTEGRITY IN REAL TIME DIAGNOSTICS

(71) Applicant: GM Cruise Holdings LLC, San Francisco, CA (US)

(72) Inventors: Daniel DSouza, Monte Sereno, CA (US); Fen Chen, Morgan Hill, CA (US); Xuefeng Wang, Cupertino, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 344 days.

(21) Appl. No.: 18/186,902

(22) Filed: Mar. 20, 2023

(65) Prior Publication Data
US 2024/0317244 A1   Sep. 26, 2024

(51) Int. Cl.
*B60W 50/02*   (2012.01)
*B60W 50/04*   (2006.01)
*G07C 5/08*   (2006.01)
*B60W 50/00*   (2006.01)

(52) U.S. Cl.
CPC ........ *B60W 50/0205* (2013.01); *B60W 50/04* (2013.01); *G07C 5/0808* (2013.01); *B60W 2050/0052* (2013.01); *B60W 2050/041* (2013.01)

(58) Field of Classification Search
CPC . G07C 5/0808; B60W 50/0205; B60W 50/04; B60W 2050/0054; B60W 2050/041; B60W 2050/021; B60W 2050/0052; B60W 2050/0055; B60W 2050/0056; H04L 67/00
See application file for complete search history.

(56) References Cited

U.S. PATENT DOCUMENTS

| | | | | |
|---|---|---|---|---|
| 5,963,112 A | * | 10/1999 | Moschytz | H03H 11/126 327/558 |
| 6,646,498 B2 | * | 11/2003 | Mohieldin | H03H 11/1213 327/552 |
| 7,003,120 B1 | * | 2/2006 | Smith | G10H 1/383 381/103 |
| 2006/0220752 A1 | * | 10/2006 | Fukusen | H03H 11/1286 333/17.1 |
| 2019/0131935 A1 | * | 5/2019 | Chou | H03F 3/181 |
| 2021/0020412 A1 | * | 1/2021 | Kim | H01J 37/3244 |
| 2021/0132229 A1 | * | 5/2021 | Milkov | G01S 7/4863 |
| 2022/0131563 A1 | * | 4/2022 | Sayed | H04B 1/0483 |
| 2023/0305179 A1 | * | 9/2023 | Powell | G01V 3/17 |

* cited by examiner

*Primary Examiner* — Quan Tra
(74) *Attorney, Agent, or Firm* — CANTOR COLBURN LLP

(57) ABSTRACT

Systems and methods for real time and predictive diagnostics of vehicle electronic components. Circuit boards and similar vehicle electronic devices have input/output speeds on the order of tens of gigahertz (GHz). Signal integrity can be affected when operating in real time while a high speed signal travels across circuit boards. To maintain signal integrity, hardware around high speed signals is designed to match impedance and transmission lengths. Additionally, differences can occur from circuit board to circuit board due to aging during vehicle operation, and tolerances in the manufacturing process. Systems and methods are provided herein to compensate for the tolerances in the manufacturing process. The real time and predictive diagnostics of vehicle electronic components provided herein can prevent on-road vehicle failures.

19 Claims, 10 Drawing Sheets

650

TUNABLE FILTERS FOR SIGNAL INTEGRITY IN REAL TIME DIAGNOSTICS

BACKGROUND

1. Technical Field

The present disclosure generally relates to diagnostics of vehicle electronic components and, more specifically, to real time and predictive diagnostics of vehicle electronic components.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, ultrasonic sensors, inertial sensor module (ISM), acoustic sensors, amongst others. The sensors perceive the environment around the vehicles and collect massive data and measurements that the autonomous vehicle can use for operations such as control and navigation. The sensors can provide the data and measurements to an internal computing system of the autonomous vehicle, which can use the data and measurements to predict, plan and control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.
Overview Systems and methods are provided for the diagnostics of vehicle electronics, such as vehicle computer boards. In particular, systems and methods are provided for real time and predictive diagnostics of vehicle electronic components. In general, circuit boards and similar vehicle electronic devices have input/output speeds on the order of tens of gigahertz (GHz). Signal integrity can be affected when operating in real time while a high speed signal travels across circuit boards. To maintain signal integrity, hardware around high speed signals is designed to match impedance and transmission lengths. Additionally, differences can occur from circuit board to circuit board for a variety of reasons, such as due to tolerances in the manufacturing process, aging of the electronic components, external electromagnetic interference, and ambient surroundings. Systems and methods are provided herein to compensate for the tolerances in the manufacturing process. The real time and predictive diagnostics of vehicle electronic components provided herein can prevent on-road vehicle failures.

Figure 1:
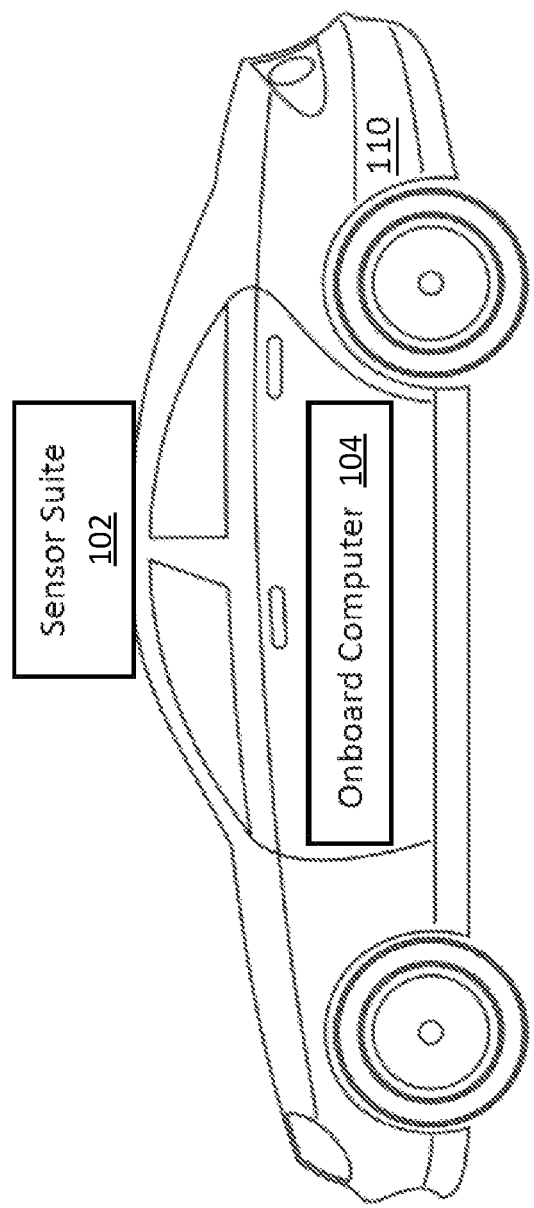
FIG. 1 illustrates an autonomous vehicle including real-time diagnostic technology, according to some examples of the present disclosure.

Additionally, signal integrity can be affected when testing a device on a test circuit board. During the testing of electronic components, yield fallout can be high, even for good components, because of noise in the form of lower or higher frequency harmonics from imperfectly matched traces, device contacts, socket contacts, and other related hardware. The systems and methods discussed herein can be used to dynamically adjust one or more filters to target the noise, improving testing yields, which results in cost savings.
Example Vehicle for Real Time Diagnostics FIG. 1 illustrates an autonomous vehicle 110 including real-time diagnostic technology, according to some examples of the present disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. In some examples, the autonomous vehicle 110 is a personal autonomous vehicle that is used by one or more owners for driving to selected destinations. In some examples, the autonomous vehicle 110 can connect with a central computer to download vehicle updates, maps, and other vehicle data. The onboard computer includes real-time diagnostic technology, as described herein.

The sensor suite 102 includes localization and driving sensors. For example, the sensor suite 102 may include one or more of photodetectors, cameras, RADAR, sound navigation and ranging (SONAR), LIDAR, Global Positioning System (GPS), inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment. In particular, the sensor suite 102 can be used to identify information and determine various factors regarding an autonomous vehicle's environment. In some examples, data from the sensor suite 102 can be used to update a map with information used to develop layers with waypoints identifying various detected items, such as locations of roadside shelters. Additionally, sensor suite 102 data can provide localized traffic information, ongoing road work information, and current road condition information. Furthermore, sensor suite 102 data can provide current environmental information, including current roadside environment information, such as the presence of people, crowds, and/or objects on a roadside or sidewalk. In this way, sensor suite 102 data from many autonomous vehicles can continually provide feedback to the mapping system and a high fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point cloud of the region intended to scan. In still further examples, the sensor suite 102 includes RADARs implemented using scanning RADARS with a dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine the state of the autonomous vehicle 110. In some examples, the onboard computer 104 checks for vehicle updates from a central computer or other secure access points. In some examples, the onboard computer 104 performs real time diagnostics of circuit boards in the vehicle. In some examples, the onboard computer 104 performs real time diagnostics of signal transmissions in the vehicle. In some examples, a vehicle sensor log receives and stores processed sensed sensor suite 102 data from the onboard computer 104. In some examples, a vehicle sensor log receives sensor suite 102 data from the sensor suite 102. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Additionally, based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine the states of the autonomous vehicle. In some implementations, the onboard computer 104 is a general purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, a bicycle, a scooter, a tractor, a lawn mower, a commercial vehicle, an airport vehicle, or a utility vehicle. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Circuit Board for Real Time Diagnostics

Figures 2A, 2B:
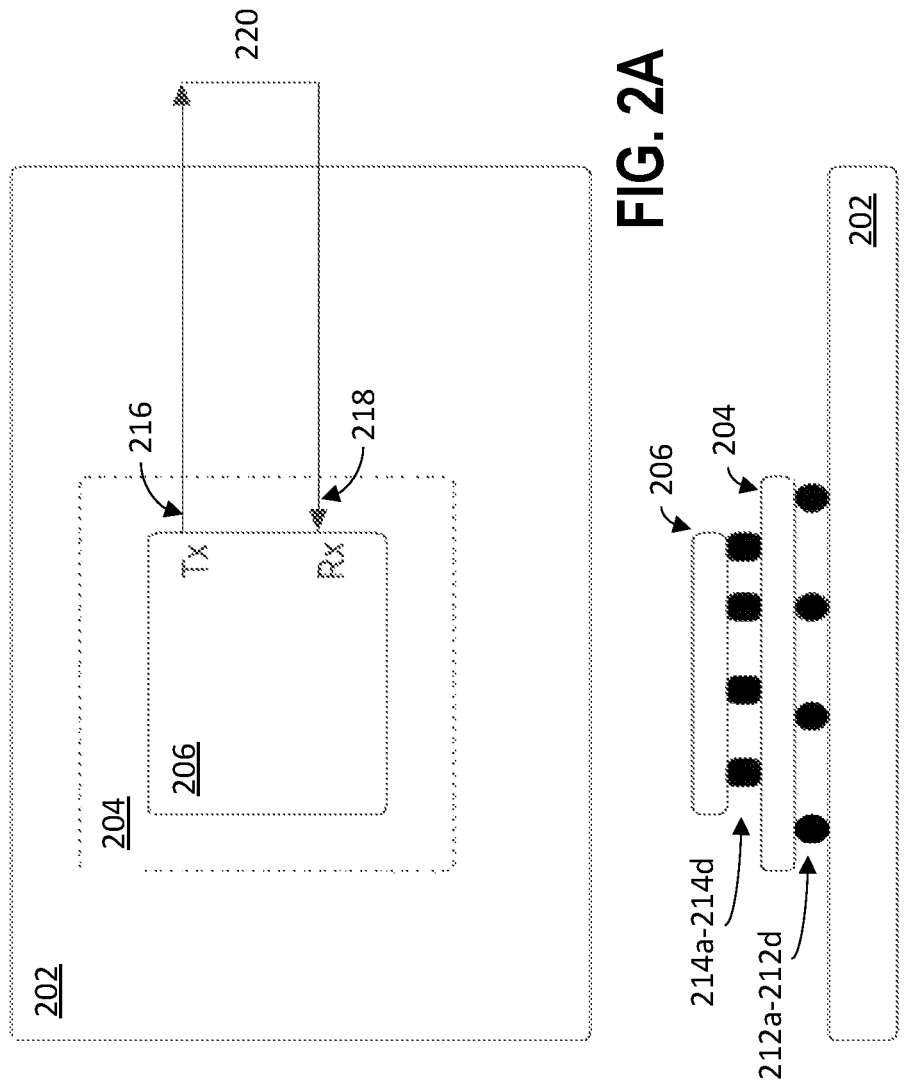
FIGS. 2A, 2B show two views of a test board in self-test and/or loopback mode, according to some examples of the present disclosure.

FIGS. 2A, 2B show two views of a test board 202 in self-test and/or loopback mode, according to some examples of the present disclosure. FIG. 2A shows a top view of the test board 202, including a device under test 206, as well as a device socket 204. As shown in the side view of FIG. 2B, there are multiple socket-test board contacts 212a-212d, as well as multiple device-socket contacts 214a-214d. The device under test 206 can be tested via a direct loopback 220 of the signal from the transmit path 216 (Tx output) to the receive path 218 (Rx input). In some examples, the loopback 220 is a coaxial cable. In some examples, the loopback 220 is onboard 202 traces. The length of the travel path of the signal is fairly short. The travel path includes the transmit path 216 and the receive path 218, which generally allows for the preservation of some signal integrity. However, the signal travels through the socket-test board contacts 212a-212d, and the device-socket contacts 214a-214d. The socket-test board contacts 212a-212d and the device-socket contacts 214a-214d can contribute to a break in the signal travel path, adding harmonics to the signal. In some examples, if the contacts 212a-212d, 214a-214d are not properly matched, the signal will have undesirable harmonics. Additionally, ripples in the power supply and/or crosstalk from adjacent signals can add noise and/or additional harmonics to the signal. This can degrade the signal and cause inaccurate testing. Inaccurate testing can result in shipping bad components or rejecting good components or both.

Figure 3A:
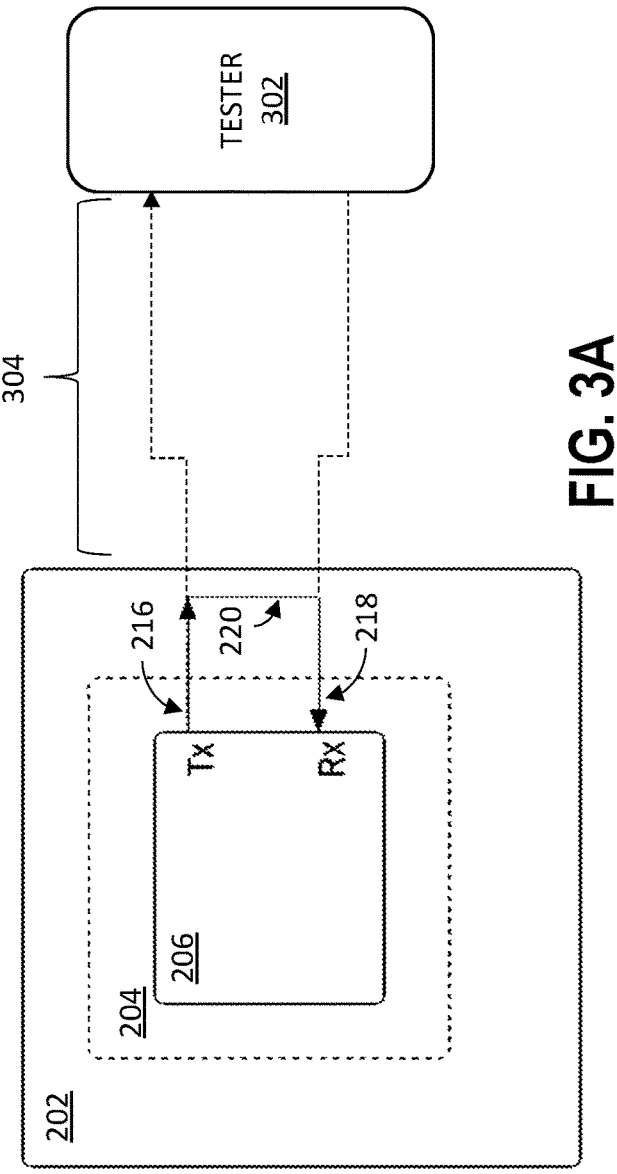
FIGS. 3A, 3B show two views of a test board with a separate tester, according to some examples of the present disclosure.
Figure 3B:
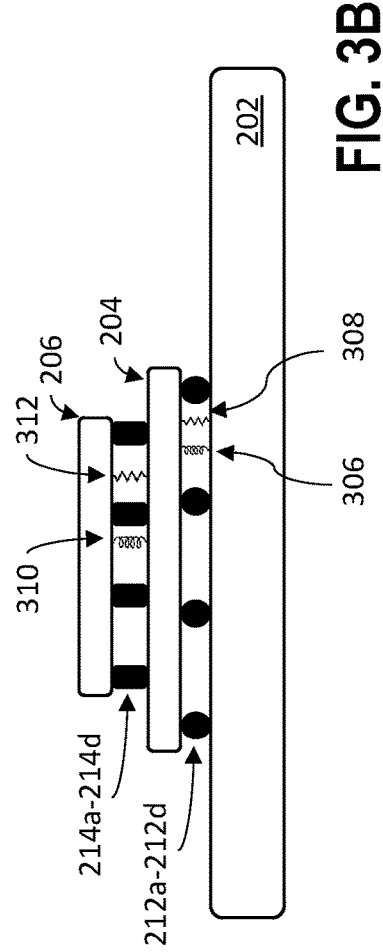

FIGS. 3A, 3B show two views of the test board 202 with a separate tester 302, according to some examples of the present disclosure. FIG. 3A is a top view of the test board 202 and tester 302. As shown in FIG. 3A, the signal from the transmit output of the device under test 206 is transmitted to the tester 302. The tester 302 can include various comparators and drivers to test the signal. The tester 302 transmits the tested signal back to the receive input of the device under test 206. Thus, the signal path that the signal travels includes an extra distance 304, which the signal travels first on the transmit path and then on the receive path. The additional distance can add more attenuation and noise to the signal.

FIG. 3B shows a side view of the test board 202, device socket 204, and device under test 206, according to some examples of the present disclosure. As shown in FIG. 3B, electronic components can be added between the test board 202 and device socket 204, as well as between the device socket 204 and the device under test 206 to filter out harmonics. For example, an inductor 306 and/or a resistor 308 can be positioned between various contacts 212a-212d. Similarly, an inductor 310 and/or a resistor 312 can be positioned between various contacts 214a-214d. The inductors 306, 310 can act as a filter to filter out the low frequency harmonics. The inductors 306, 310 can be inductors to ground. Similarly, the resistors 308, 312 can act as a filter to filter out the low frequency harmonics. The resistors 308, 312 can be resistors to ground. In some examples, a capacitor to ground is positioned between various contacts 212a-212d, 214a-214d to filter out high frequency harmonics.

The filters 306, 308, 310, 312 used to filter out harmonics and/noise are fixed filters, having fixed characteristics. Thus, a filter that is perfectly matched with a first circuit board may not be matched with a second circuit board. The second board can have a different set of harmonics, such that the fixed filter will not be as effective. Additionally, circuit boards are often tested for different data rates, and each data rate results in different harmonics and/or noise. Thus, a customized filter would be added for each data rate, resulting in additional electrical components. Even with customized filters, it is extremely difficult to perfectly match different data rates.

In various implementations, an active filter is placed between the transmission from the Tx output and the reception at the Rx input. The active filter can be positioned in the loopback 220. The active filter dynamically adjusts to target the noise, removing harmonics between the Tx output and the RX input. The active filter can be dynamically programmed to target the harmonics (and/or noise) across different circuit boards for the same device. Additionally, the active filter can be dynamically programmed to target the harmonics (and/or noise) for different data rates for the same device.

Figure 4:
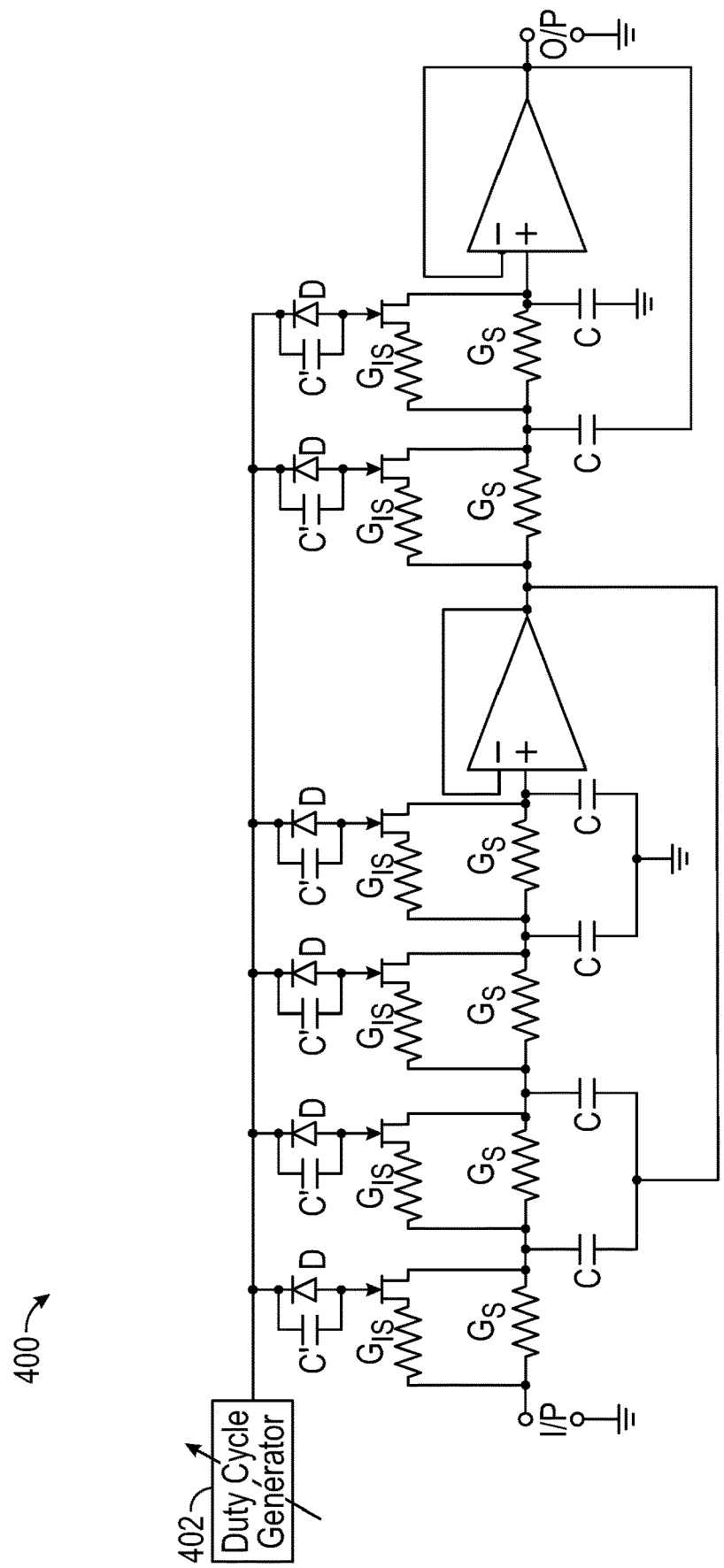
FIG. 4 is an example of a tunable low pass filter, according to some examples of the present disclosure.

FIG. 4 is an example of a tunable low pass filter 400, according to some examples of the present disclosure. In particular, the filter 400 is a sixth order tunable low pass filter. In various examples, the filter 400 can be manufactured as a component on an integrated circuit. In some examples, the filter 400 can be manufactured from discrete components. The cutoff frequency of the filter, can be controlled by varying the duty cycle of the pulse generator 402. Additionally, the duty cycle of the pulse generator 402 can be adjusted to cause the filter 400 to act as a low pass filter, a high pass filter, or a bandpass filter.

Figure 5:
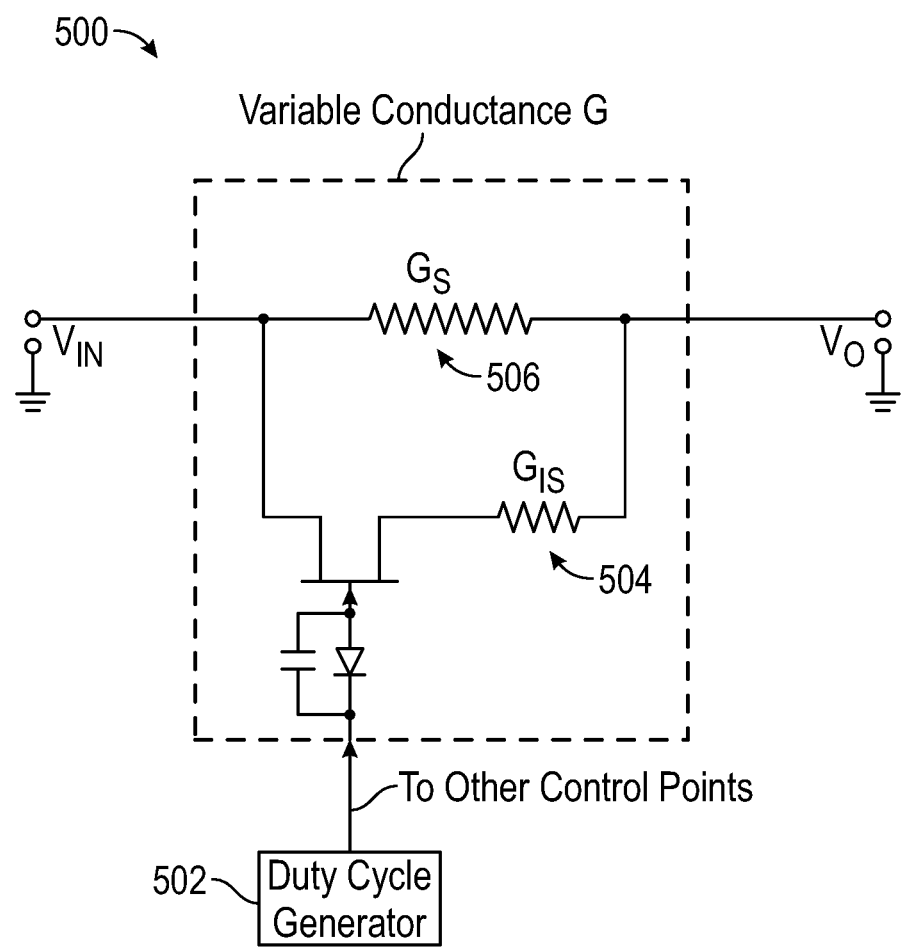
FIG. 5 is an example of a simple circuit for controlling the conductance by adjusting the duty cycle, according to some examples of the present disclosure.

FIG. 5 is an example of a simple circuit for controlling the conductance by adjusting the duty cycle, according to some examples of the present disclosure. In particular, during the "on" period of a pulse from the duty cycle generator 502, the conductance of G15 of the resistor 504 is activated along with the conductance G5 of the resistor 506. Since the resistors 504 and 506 are in parallel, the effective conductance during the "on" period ($G_{on}$) is the sum of G5+G15. During the "off" period, the conductance G15 is disconnected and the effective conductance during the "off" period ($G_{off}$) is G5. Thus, if the duty cycle at the duty cycle generator 502 is 50%, the effective conductance is $G_{on}+G_{off}$ divided by 2. For various duty cycles 0% and 100%, the effective conductance will vary between G5 and G5+G15. In various examples, the conductances G5 and G15 can have different values. The cutoff frequency of the filter is determined by the capacitance value of the capacitor as well as the conductance values of the resistors.

Referring back to FIG. 4, the active tunable filter 400 includes multiple operational amplifiers, capacitors, and resistors. The input to each operational amplifier is a pulse wave (or a square wave). The duty cycle of the pulse wave is controlled by the duty cycle generator 402, and the cutoff frequency of the filter 400 can be adjusted based on the duty cycle. The duty cycle can be adjusted using software to change the input pulse of a square wave signal at the duty cycle generator. Thus, the filter 400 can be fabricated and assembled (and the filter can be integrated into a circuit board or chip), and the filter characteristics can be dynamically adjusted using software.

The filter includes two operational amplifiers, and several feedback loops from the operational amplifiers, including switched capacitors and resistors. In some examples, switching of the switched capacitors is based on the square wave with different duty cycles, where the square wave is generated by the duty cycle generator 402. As shown in FIG. 4, the active tunable filter 400 is a sixth order filter. This improves the performance of the filter, allowing the filter to have a sharp cut off slope at the selected cut off frequency.

Figure 6A:
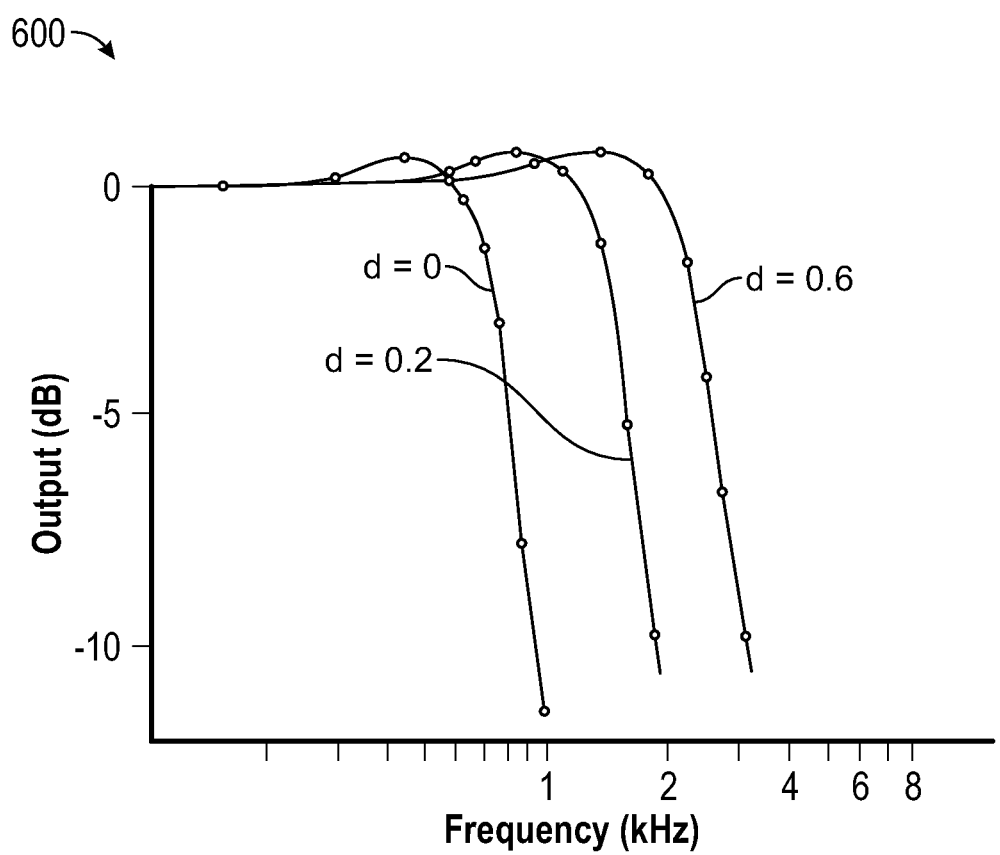
FIG. 6A, shows a low pass filter characteristic according to some examples of the present disclosure.
Figure 6B:
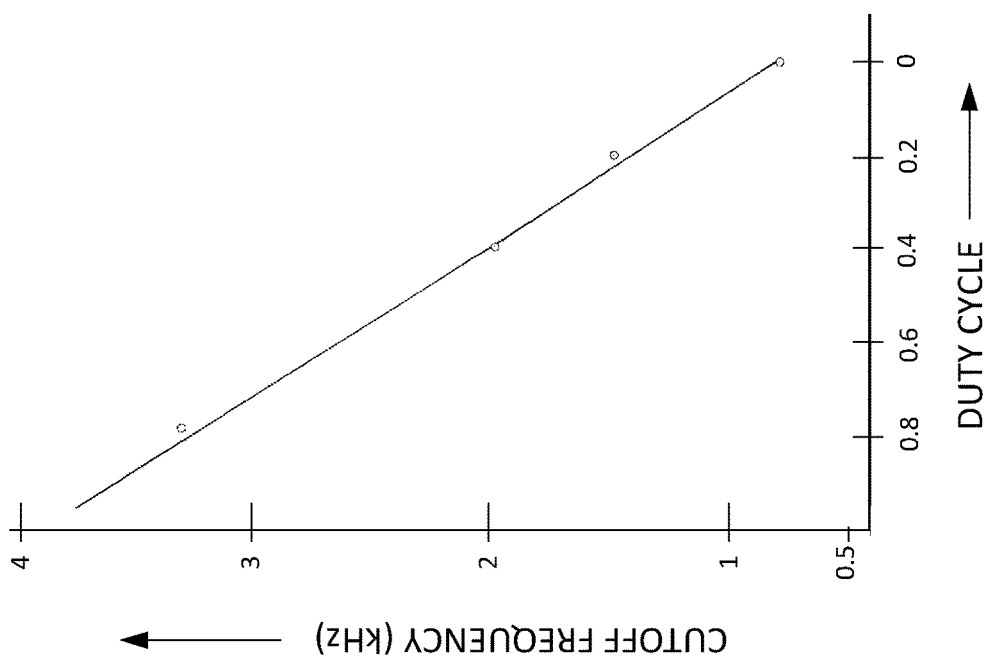
FIG. 6B shows the tuning characteristic of a low pass active filter, according to some examples of the present disclosure.

FIG. 6A is a graph 600 illustrating the frequency response of the active tunable filter 400 at selected duty cycles, according to some examples of the present disclosure. In particular, the graph 600 shows the cutoff frequency (x-axis) of the filter for a duty cycle of 0.0, a duty cycle of 0.2, and a duty cycle of 0.6. The duty cycle is determined by the value of the capacitor C in the active tunable filter 400, and the conductance Gx. FIG. 6B is a graph 650 illustrating the linear relationship between the duty cycle (x-axis) and the cutoff frequency (y-axis) for the active tunable filter 400, according to some examples of the present disclosure. In the example in FIGS. 4, 6A, and 6B the active tunable filter 400 is a low pass filter which filters out higher frequencies. In other examples, the active tunable filter described herein can be a high pass filter or a band pass filter. In some examples, the active tunable filter can be a delay equalizer.

In various examples, the frequency response of the filter 400 can be monitored and the duty cycle of the filter 400 can be actively tuned for the correct frequency response. Actively tuning the filter 400 maintains device optimal performance and stability across temperature and/or process variation.

In some examples, the filter 400 can be used in an autonomous vehicle. In some examples, in an autonomous vehicle, signal integrity is of utmost importance. The response of various components can change with varying temperatures, different environments, EMI, EMC, and with aging. Integrating an active tunable filter 400 into vehicle devices allows for optimal signal integrity in various conditions. The active tunable filter 400 can be used in an autonomous vehicle onboard computer, CPU, AI processor, as well as in other vehicle modules such as various sensors. Any module that is sensitive to environmental conditions can benefit from the addition of the active tunable filter 400 to ensure signal integrity.

In some examples, the filter is placed in proximity to the receive input port (e.g., the Rx input of FIGS. 2 and 3). When the signal is transmitted, it is generally of high quality. However, as the signal travels away from the transmit output port (e.g., Tx output of FIGS. 2 and 3), the signal degrades. Thus, close to the receive port, there are more likely to be harmonics and noise that the filter can filter out to improve signal integrity.

In some examples, the filter can be used for real time diagnostics. Device frequency can drift with time, for example due to environmental factors such as temperature, and/or due to manufacturing process weaknesses. While reliability tests can detect most potential manufacturing defects before shipping out parts, some latent defects can escape. The tuning of the filter can be programmed to sweep across the frequency range of the device to determine if there is any drift of the device frequency for diagnostic capability. The filter can be used for real time diagnostics by evaluating the signal after filtering while the device is active in functional mode. If the signal components are not acceptable following filtering by the active tunable filter 400, it can be determined that the device producing the signal has degraded. In some examples, the signal output from the filter is continuously monitored over time. Signal measurements over time can be evaluated to determine signal degradation. In some examples, signal data are remotely uploaded for monitoring over time. By capturing the potential failures in real time, the fail signature can be used to predict future failures using artificial intelligence techniques. In some examples, real time diagnostics can be performed between the onboard memory and a logic chip, such as between a DRAM and the CPU.

Figure 7:
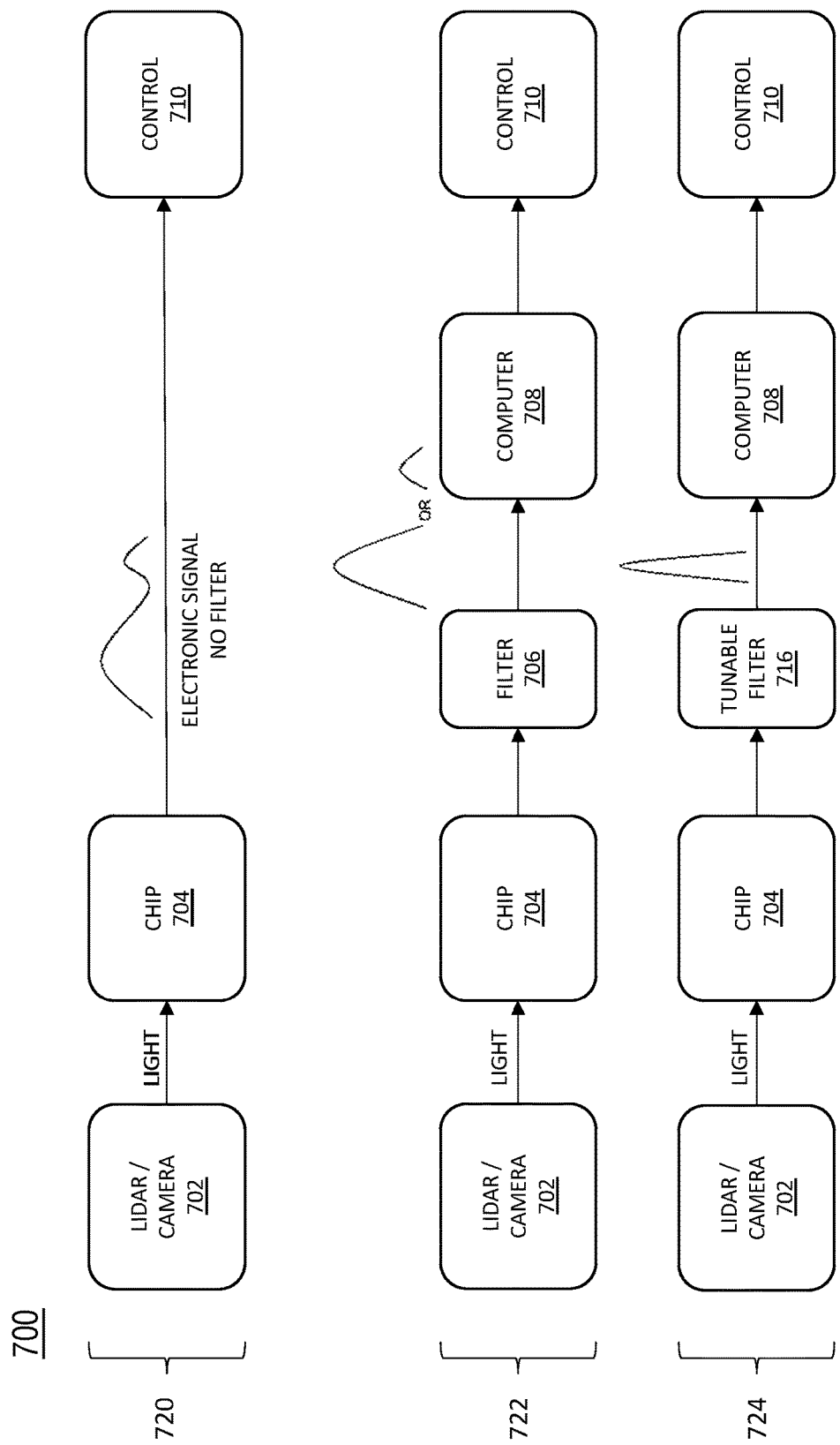
FIG. 7 shows functional flow diagrams for signal transmission, according to some examples of the present disclosure.

FIG. 7 shows functional flow diagrams for signal transmission, according to some examples of the present disclosure. In the examples of FIG. 7, the signal is transmitted from a LIDAR and/or camera sensor 702 to a chip 704. The chip 704 can be an integrated circuit, a microchip, or any other type of computer chip. As shown in the first functional flow diagram in the first row 720 of FIG. 7, the signal is transmitted from the chip 704 to a control module 710. Thus, the first row 720 of FIG. 7 shows a functional flow diagram for signal transmission without a filter. In various examples, the control module 710 is an oscillator control, and in some examples, the control module 710 is compensation circuitry.

The second flow diagram in the second row 722 of FIG. 7 includes a filter 706. In particular, the signal from the chip 704 is filtered at a fixed filter 706, and the filtered signal is received at a computer 708. In some examples, the filtered signal is received at a processor. The processed signal is then transmitted to the control module 710.

In the third flow diagram in the third row 724 of FIG. 7 includes a tunable filter 716. In particular, the signal from the chip 704 is filtered at the active tunable filter 706. As described herein, the active tunable filter 706 can be adjusted to modify its characteristics (e.g., its cutoff frequency) based on harmonics and/or noise detected in the signal from the chip 704. The tunable filter 716 filters the signal from the chip 704 and generates a filtered signal which is received at the computer 708. The computer 708 can perform real time diagnostics on the filtered signal. For example, the computer 708 can evaluate the filtered signal and detect signal defects, such as frequency drift. In one example, if the computer 708 detects frequency drift of the system's oscillator (or clock), the detection signal can be used to feedback to the oscillator control 710 or compensation circuitry to adjust and maintain the oscillator (clock) output frequency at desired values in real time. In some examples, a system's clock (or oscillator) can drift due to temperature sensitivity.

The third flow diagram 724 can be implemented as onboard self-diagnostics on a vehicle to compensate for various factors such as weather, vibration/shock, EMC (electromagnetic compatibility) impacts, EMI (electromagnetic interference) impacts, as well as general on-chip signal integrity, onboard signal integrity, and board-to-board signal integrity.

According to various implementations, the diagnostic signals can be used as real time signal quality indicators and feedback to the chip's circuits (and/or to the board's circuits) for close-loop tuning. Thus, the circuit's output can be adjusted in real time to stay at desired levels. For example, if the diagnostics signal detects frequency drift of the system's clock (or oscillator) due to temperature sensitivity, the detection signal can be used to feedback to the oscillator control to adjust and maintain the clock (or oscillator) output frequency at desired values in real time. In other examples, if the diagnostics signal detects frequency drift of the system's clock (or oscillator) for any reason, the detection signal can be fed back to compensation circuitry to adjust and maintain the clock (or oscillator) output frequency at desired values in real time. In various examples, the systems and techniques described herein provide for on-board self-diagnostics to compensate for the weather, EMC impacts, and other environmental conditions. The systems and techniques can be used to maintain on-chip signal integrity, on-board signal integrity, and board-to-board signal integrity.

Example Autonomous Vehicle (AV) Management System

Figure 8:
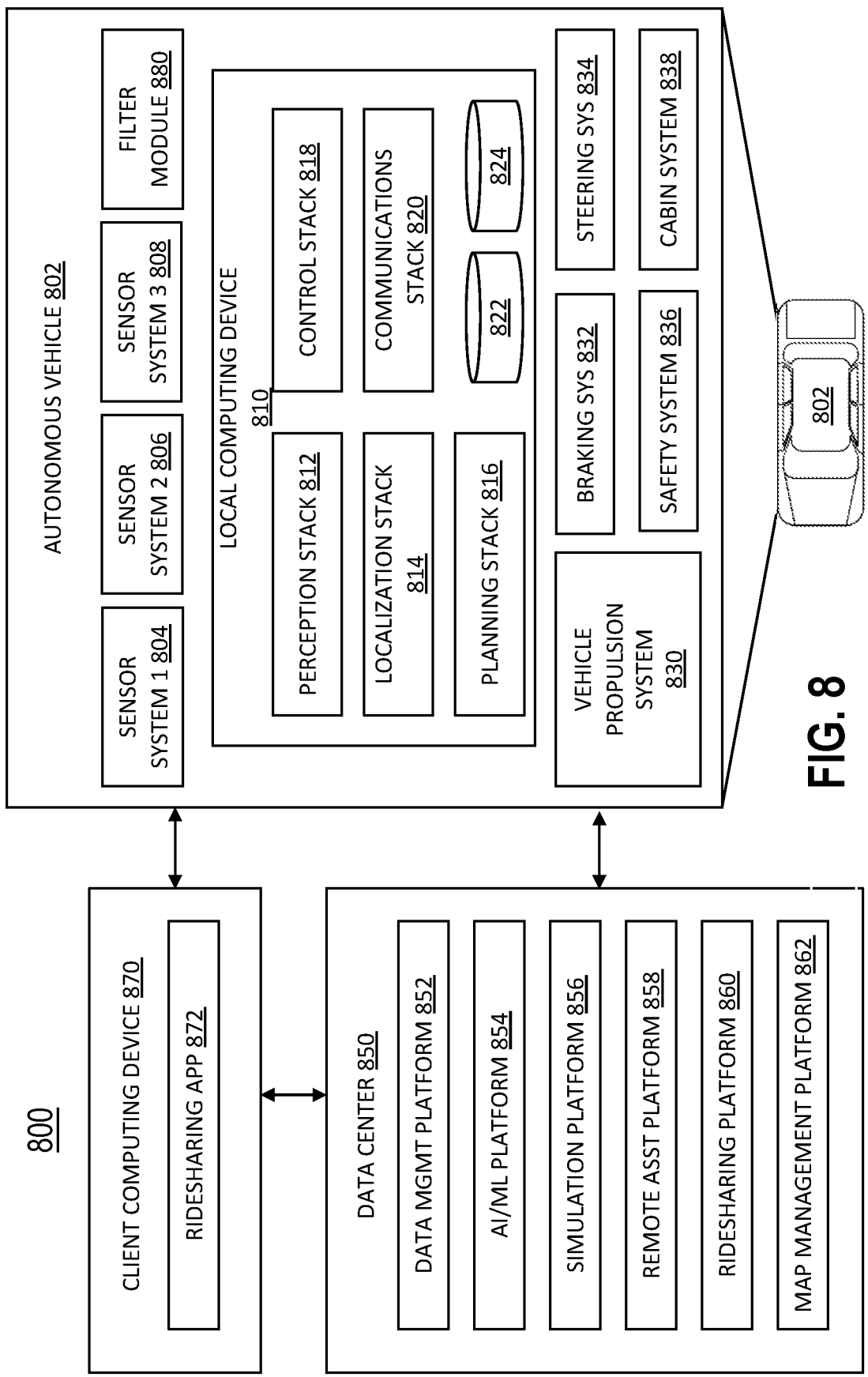
FIG. 8 illustrates an example system environment that can be used to facilitate autonomous vehicle (AV) dispatch and operations, according to some aspects of the disclosed technology.

Turning now to FIG. 8, this figure illustrates an example of an AV management system 800. One of ordinary skill in the art will understand that, for the AV management system 800 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 800 includes an AV 802, a data center 850, and a client computing device 870. The AV 802, the data center 850, and the client computing device 870 can communicate with one another over one or more networks (not shown), such as a public network (e.g., the Internet, an Infrastructure as a Service (IaaS) network, a Platform as a Service (PaaS) network, a Software as a Service (Saas) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 802 can navigate about roadways without a human driver based on sensor signals generated by multiple sensor systems 804, 806, and 808. The sensor systems 804-808 can include different types of sensors and can be arranged about the AV 802. For instance, the sensor systems 804-808 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 804 can be a camera system, the sensor system 806 can be a LIDAR system, and the sensor system 808 can be a RADAR system. Other embodiments may include any other number and type of sensors. Additionally, in various implementations, as discussed herein, an active tunable filter 880 can be used for real-time diagnostics. An active tunable filter 880 can also be added to components of the AV 802 to filter out harmonics and/or noise from transmitted signals.

AV 802 can also include several mechanical systems that can be used to maneuver or operate AV 802. For instance, the mechanical systems can include vehicle propulsion system 830, braking system 832, steering system 834, safety system 836, and cabin system 838, among other systems. Vehicle propulsion system 830 can include an electric motor, an internal combustion engine, or both. The braking system 832 can include an engine brake, a wheel braking system (e.g., a disc braking system that utilizes brake pads), hydraulics, actuators, and/or any other suitable componentry configured to assist in decelerating AV 802. The steering system 834 can include suitable componentry configured to control the direction of movement of the AV 802 during navigation. Safety system 836 can include lights and signal indicators, a parking brake, airbags, and so forth. The cabin system 838 can include cabin temperature control systems, in-cabin entertainment systems, and so forth. In some embodiments, the AV 802 may not include human driver actuators (e.g., steering wheel, handbrake, foot brake pedal, foot accelerator pedal, turn signal lever, window wipers, etc.) for controlling the AV 802. Instead, the cabin system 838 can include one or more client interfaces (e.g., Graphical User Interfaces (GUIs), Voice User Interfaces (VUIs), etc.) for controlling certain aspects of the mechanical systems 830-838.

AV 802 can additionally include a local computing device 810 that is in communication with the sensor systems 804-808, the mechanical systems 830-838, the data center 850, and the client computing device 870, among other systems. The local computing device 810 can include one or more processors and memory, including instructions that can be executed by the one or more processors. The instructions can make up one or more software stacks or components responsible for controlling the AV 802; communicating with the data center 850, the client computing device 870, and other systems; receiving inputs from riders, passengers, and other entities within the AV's environment; logging metrics collected by the sensor systems 804-808; and so forth. In this example, the local computing device 810 includes a perception stack 812, a mapping and localization stack 814, a planning stack 816, a control stack 818, a communications stack 820, a High Definition (HD) geospatial database 822, and an AV operational database 824, among other stacks and systems.

Perception stack 812 can enable the AV 802 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 804-808, the mapping and localization stack 814, the HD geospatial database 822, other components of the AV, and other data sources (e.g., the data center 850, the client computing device 870, third-party data sources, etc.). The perception stack 812 can detect and classify objects and determine their current and predicted locations, speeds, directions, and the like. In addition, the perception stack 812 can determine the free space around the AV 802 (e.g., to maintain a safe distance from other objects, change lanes, park the AV, etc.). The perception stack 812 can also identify environmental uncertainties, such as where to look for moving objects, flag areas that may be obscured or blocked from view, and so forth.

Mapping and localization stack 814 can determine the AV's position and orientation (pose) using different methods from multiple systems (e.g., GPS, IMUs, cameras, LIDAR, RADAR, ultrasonic sensors, the HD geospatial database 822, etc.). For example, in some embodiments, the AV 802 can compare sensor data captured in real-time by the sensor systems 804-808 to data in the HD geospatial database 822 to determine its precise (e.g., accurate to the order of a few centimeters or less) position and orientation. The AV 802 can focus its search based on sensor data from one or more first sensor systems (e.g., GPS) by matching sensor data from one or more second sensor systems (e.g., LIDAR). If the mapping and localization information from one system is unavailable, the AV 802 can use mapping and localization information from a redundant system and/or from remote data sources.

The planning stack 816 can determine how to maneuver or operate the AV 802 safely and efficiently in its environment. For example, the planning stack 816 can receive the location, speed, and direction of the AV 802, geospatial data, data regarding objects sharing the road with the AV 802 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 802 from one point to another. The planning stack 816 can determine multiple sets of one or more mechanical operations that the AV 802 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 816 can select from multiple backup plans to carry out. For example, while preparing to change lanes to turn right at an intersection, another vehicle may aggressively cut into the destination lane, making the lane change unsafe. The planning stack 816 could have already determined an alternative plan for such an event, and upon its occurrence, help to direct the AV 802 to go around the block instead of blocking a current lane while waiting for an opening to change lanes.

The control stack 818 can manage the operation of the vehicle propulsion system 830, the braking system 832, the steering system 834, the safety system 836, and the cabin system 838. The control stack 818 can receive sensor signals from the sensor systems 804-808 as well as communicate with other stacks or components of the local computing device 810 or a remote system (e.g., the data center 850) to effectuate operation of the AV 802. For example, the control stack 818 can implement the final path or actions from the multiple paths or actions provided by the planning stack 816. This can involve turning the routes and decisions from the planning stack 816 into commands for the actuators that control the AV's steering, throttle, brake, and drive unit.

The communication stack 820 can transmit and receive signals between the various stacks and other components of the AV 802 and between the AV 802, the data center 850, the client computing device 870, and other remote systems. The communication stack 820 can enable the local computing device 810 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 820 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 822 can store HD maps and related data of the streets upon which the AV 802 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 824 can store raw AV data generated by the sensor systems 804-808 and other components of the AV 802 and/or data received by the AV 802 from remote systems (e.g., the data center 850, the client computing device 870, etc.). In some embodiments, the raw AV data can include HD LIDAR point cloud data, image or video data, RADAR data, GPS data, and other sensor data that the data center 850 can use for creating or updating AV geospatial data as discussed further elsewhere in the present disclosure.

The data center 850 can be a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and so forth. The data center 850 can include one or more computing devices remote to the local computing device 810 for managing a fleet of AVs and AV-related services. For example, in addition to managing the AV 802, the data center 850 may also support a ridesharing service, a delivery service, a remote/roadside assistance service, street services (e.g., street mapping, street patrol, street cleaning, street metering, parking reservation, etc.), and the like.

The data center 850 can send and receive various signals to and from the AV 802 and the client computing device 870. These signals can include sensor data captured by the sensor systems 804-808, roadside assistance requests, software updates, ridesharing pick-up and drop-off instructions, and so forth. In this example, the data center 850 includes one or more of a data management platform 852, an Artificial Intelligence/Machine Learning (AI/ML) platform 854, a simulation platform 856, a remote assistance platform 858, a ridesharing platform 860, and a map management platform 862, among other systems.

Data management platform 852 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 850 can access data stored by the data management platform 852 to provide their respective services.

The AI/ML platform 854 can provide the infrastructure for training and evaluating machine learning algorithms for operating the AV 802, the simulation platform 856, the remote assistance platform 858, the ridesharing platform 860, the map management platform 862, and other platforms and systems. Using the AI/ML platform 854, data scientists can prepare data sets from the data management platform 852; select, design, and train machine learning models; evaluate, refine, and deploy the models; maintain, monitor, and retrain the models; and so on.

The simulation platform 856 can enable testing and validation of the algorithms, machine learning models, neural networks, and other development efforts for the AV 802, the remote assistance platform 858, the ridesharing platform 860, the map management platform 862, and other platforms and systems. The simulation platform 856 can replicate a variety of driving environments and/or reproduce real-world scenarios from data captured by the AV 802, including rendering geospatial information and road infrastructure (e.g., streets, lanes, crosswalks, traffic lights, stop signs, etc.) obtained from the map management platform 862; modeling the behavior of other vehicles, bicycles, pedestrians, and other dynamic elements; simulating inclement weather conditions, different traffic scenarios; and so on.

The remote assistance platform 858 can generate and transmit instructions regarding the operation of the AV 802. For example, in response to an output of the AI/ML platform 854 or other system of the data center 850, the remote assistance platform 858 can prepare instructions for one or more stacks or other components of the AV 802.

The ridesharing platform 860 can interact with a customer of a ridesharing service via a ridesharing application 872 executing on the client computing device 870. The client computing device 870 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 872. The client computing device 870 can be a customer's mobile computing device or a computing device integrated with the AV 802 (e.g., the local computing device 810). The ridesharing platform 860 can receive requests to be picked up or dropped off from the ridesharing application 872 and dispatch the AV 802 for the trip.

Map management platform 862 can provide a set of tools for the manipulation and management of geographic and spatial (geospatial) and related attribute data. The data management platform 852 can receive LIDAR point cloud data, image data (e.g., still image, video, etc.), RADAR data, GPS data, and other sensor data (e.g., raw data) from one or more AVs 802, Unmanned Aerial Vehicles (UAVs), satellites, third-party mapping services, and other sources of geospatially referenced data. The raw data can be processed, and map management platform 862 can render base representations (e.g., tiles (2D), bounding volumes (3D), etc.) of the AV geospatial data to enable users to view, query, label, edit, and otherwise interact with the data. Map management platform 862 can manage workflows and tasks for operating on the AV geospatial data. Map management platform 862 can control access to the AV geospatial data, including granting or limiting access to the AV geospatial data based on user-based, role-based, group-based, task-based, and other attribute-based access control mechanisms. Map management platform 862 can provide version control for the AV geospatial data, such as to track specific changes that (human or machine) map editors have made to the data and to revert changes when necessary. Map management platform 862 can administer release management of the AV geospatial data, including distributing suitable iterations of the data to different users, computing devices, AVs, and other consumers of HD maps. Map management platform 862 can provide analytics regarding the AV geospatial data and related data, such as to generate insights relating to the throughput and quality of mapping tasks.

In some embodiments, the map viewing services of map management platform 862 can be modularized and deployed as part of one or more of the platforms and systems of the data center 850. For example, the AI/ML platform 854 may incorporate the map viewing services for visualizing the effectiveness of various object detection or object classification models, the simulation platform 856 may incorporate the map viewing services for recreating and visualizing certain driving scenarios, the remote assistance platform 858 may incorporate the map viewing services for replaying traffic incidents to facilitate and coordinate aid, the ridesharing platform 860 may incorporate the map viewing services into the client application 872 to enable passengers to view the AV 802 in transit en route to a pick-up or drop-off location, and so on.

Example Processing System

Figure 9:
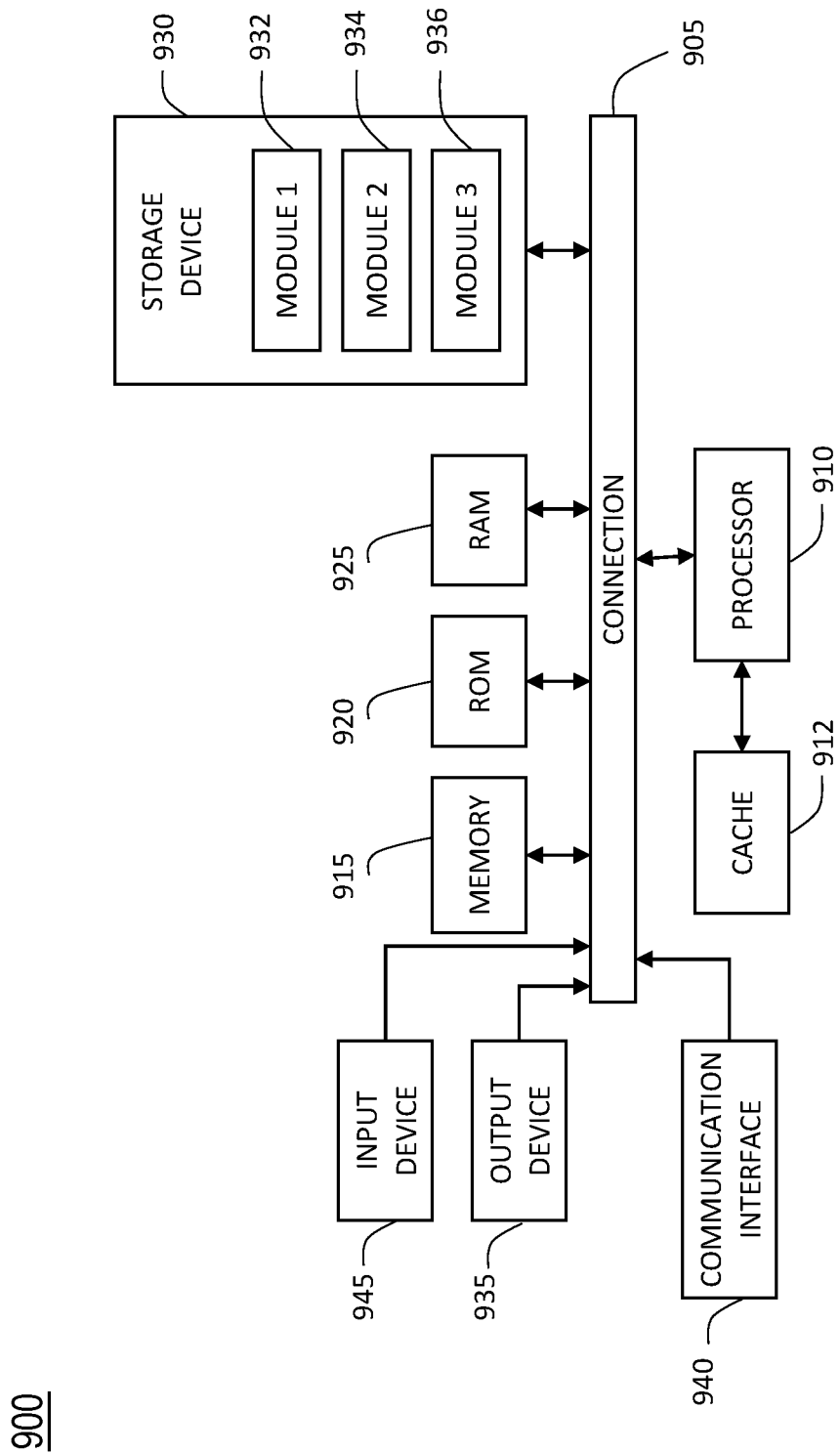
FIG. 9 illustrates an example processor-based system with which some aspects of the subject technology can be implemented.

FIG. 9 illustrates an example processor-based system with which some aspects of the subject technology can be implemented. For example, processor-based system 900 can be any computing device making up, or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection. In various examples, an active tunable filter as discussed herein can be added to any of the components to filter harmonics and/or noise from transmitted signals.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (Central Processing Unit (CPU) or processor) 910 and connection 905 that couples various system components including system memory 915, such as Read-Only Memory (ROM) 920 and Random-Access Memory (RAM) 925 to processor 910. Computing system 900 can include a cache of high-speed memory 912 connected directly with, in close proximity to, or integrated as part of processor 910.

Processor 910 can include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 930 can include software services, servers, services, etc., that when the code that defines such software is executed by the processor 910, it causes the system 900 to perform a function. In some embodiments, a hardware service that performs a particular function can include the software component stored in a computer-readable medium in connection with the necessary hardware components, such as processor 910, connection 905, output device 935, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 provides a method for real time filtering of signal transmissions in a vehicle, comprising: transmitting a transmit signal from a first vehicle component, wherein the transmit signal is a high speed signal; detecting harmonics in the transmit signal; adjusting an active tunable filter to target the detected harmonics, wherein adjusting includes modifying a duty cycle of a pulse generator to change a filter conductance of the active tunable filter; filtering the transmit signal at the active tunable filter to filter out selected detected harmonics, wherein the selected detected harmonics are in a selected frequency range; and receiving the filtered signal at a second vehicle component Example 2 provides a system for real time filtering of signal transmissions in a vehicle, comprising: a first vehicle component configured to transmit a first signal, wherein the first signal is a high speed signal; a signal sensor to detect harmonics in the first signal; an active tunable filter configured to filter out the detected harmonics, wherein the active tunable filter is adjustable to modify a selected frequency range, wherein frequencies in the selected frequency range are filtered out of the first signal by the active tunable filter, wherein the active tunable filter includes a pulse generator having a duty cycle, and modifying the duty cycle of the pulse generator causes modification of the selected frequency range, and wherein the active tunable filter is configured to filter the first signal to filter out selected detected harmonics in the selected frequency range and transmit a filtered signal; and a second vehicle component to receive the filtered signal.

Example 3 provides a system, method, circuit, and/or vehicle according to one or more of the preceding and/or following examples, wherein the active tunable filter includes a first conductance and a second conductance, wherein the first and second conductances are in parallel, and wherein adjusting the active tunable filter includes changing the first conductance to zero during an off period of the duty cycle.

Example 4 provides a system, method, circuit, and/or vehicle according to one or more of the preceding and/or following examples, wherein the active tunable filter is integrated into an onboard integrated circuit.

Example 5 provides a system, method, circuit, and/or vehicle according to one or more of the preceding and/or following examples, wherein transmitting the transmit signal includes transmitting the transmit signal at a signal speed of more than 10 GHz.

Example 6 provides a system, method, circuit, and/or vehicle according to one or more of the preceding and/or following examples, further comprising detecting noise in the transmit signal.

Example 7 provides a system, method, circuit, and/or vehicle according to one or more of the preceding and/or following examples, wherein detecting, diagnosing, adjusting, and filtering the signal occur while the vehicle is driving.

Example 8 provides a system, method, circuit, and/or vehicle according to one or more of the preceding and/or following examples, wherein the active tunable filter is one of a fifth order filter, a sixth order filter, and a greater than sixth order filter, and wherein adjusting the active tunable filter includes adjusting the selected frequency range.

Example 9 provides a system, method, circuit, and/or vehicle according to one or more of the preceding and/or following examples, wherein transmitting the transmit signal includes transmitting the transmit signal from an onboard memory to an onboard processor.

Example 10 provides a system, method, circuit, and/or vehicle according to one or more of the preceding and/or following examples, further comprising diagnosing and predicting a failure of the first component based on characteristics of the filtered signal.

Example 11 provides a system, method, circuit, and/or vehicle according to one or more of the preceding and/or following examples, further comprising modifying an operating behavior of the first vehicle component based on the harmonics detected in the transmit signal.

Example 12 provides a system, method, circuit, and/or vehicle according to one or more of the preceding and/or following examples, wherein the active tunable filter has a filter conductance, and wherein modifying the duty cycle of the pulse generator changes the filter conductance.

Example 13 provides a system, method, circuit, and/or vehicle according to one or more of the preceding and/or following examples, wherein the filter conductance includes a first conductance and a second conductance, wherein the first and second conductances are in parallel, and wherein during an off period of the duty cycle, the first conductance is zero.

Example 14 provides a system, method, circuit, and/or vehicle according to one or more of the preceding and/or following examples, wherein the first vehicle component and the active tunable filter are integrated into an integrated circuit onboard the vehicle.

Example 15 provides a system, method, circuit, and/or vehicle according to one or more of the preceding and/or following examples, wherein the signal sensor is further configured to detect noise in the first signal, and wherein the active tunable filter is further configured to filter out the noise.

Example 16 provides a system, method, circuit, and/or vehicle according to one or more of the preceding and/or following examples, wherein the active tunable filter is one of a fifth order filter, a sixth order filter, and a greater than sixth order filter.

Example 17 provides a system, method, circuit, and/or vehicle according to one or more of the preceding and/or following examples, wherein the first vehicle component is an onboard memory and the second vehicle component is an onboard processor.

Example 18 provides a system, method, circuit, and/or vehicle according to one or more of the preceding and/or following examples, wherein the onboard processor is configured to diagnose failure of the onboard memory based on characteristics of the filtered signal.

Example 19 provides a system, method, circuit, and/or vehicle according to one or more of the preceding and/or following examples, wherein the signal sensor is configured to generate a detection signal, and the first component includes an operating behavior, and wherein the first component is configured to modify the operating behavior based on the detection signal.

Example 20 provides a circuit board for real time filtering of signal transmissions, comprising a first component configured to transmit a first signal, wherein the first signal is a high speed signal; a signal sensor to detect harmonics in the first signal; an active tunable filter configured to filter out the detected harmonics, wherein the active tunable filter is adjustable to modify a selected frequency range filtered out of the first signal by the active tunable filter, wherein the active tunable filter includes a pulse generator having a duty cycle, and modifying the selected frequency range includes modifying the duty cycle of the pulse generator, and wherein the active tunable filter is configured to filter the first signal to filter out selected detected harmonics in the selected frequency range and transmit a filtered signal; and a second component to receive the filtered signal.

Example 21 provides a system, method, circuit, and/or vehicle according to one or more of the preceding and/or following examples, wherein the signal sensor is further configured to detect noise in the first signal, and wherein the active tunable filter is further configured to filter out the noise.

Example 22 provides a system, method, circuit, and/or vehicle according to one or more of the preceding and/or following examples, wherein the active tunable filter includes a first resistor having a first conductance and a second resistor having a second conductance, wherein the first and second resistors are in parallel on the circuit board, wherein a total conductance is a sum of the first and second conductances, and wherein during an off period of the duty cycle, the first conductance is zero.

Example 23 provides a system, method, circuit, and/or vehicle according to one or more of the preceding and/or following examples, wherein the detection signal from the signal sensor is used to change the operating behavior of the first component.

Example 24 provides a system, method, circuit, and/or vehicle according to one or more of the preceding and/or following examples, further comprising continuously evaluating the filtered signal over time, and, based on the continuous evaluation, detecting degradation of the filtered signal over time.

Example 25 provides a system, method, circuit, and/or vehicle according to one or more of the preceding and/or following examples, further comprising remotely uploading the filtered signal for monitoring over time.

Example 26 provides a system, method, circuit, and/or vehicle according to one or more of the preceding and/or following examples, further comprising capturing potential failures in real time, based on the detected degradation of the filtered signal.

Example 27 provides a system, method, circuit, and/or vehicle according to one or more of the preceding and/or following examples, further comprising generating a fail signature based on the captured potential failures.

Example 28 provides a system, method, circuit, and/or vehicle according to one or more of the preceding and/or following examples, further comprising using artificial intelligence to predict future failures based on the fail signature.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method for real time, adaptive filtering of signal transmissions in a vehicle, comprising:
    transmitting a high-speed transmit signal, the high-speed transmit signal including frequencies on the order of 10 gigahertz and higher, from a first vehicle component;
    detecting harmonics in the high-speed transmit signal;
    adjusting an active tunable filter electrically disposed between the first vehicle component and a second vehicle component, wherein the adjusting includes modulating a pulse wave signal to modify a duty cycle of a pulse generator to change a filter conductance of the active tunable filter;
    filtering the high-speed transmit signal at the active tunable filter to filter out selected detected harmonics, wherein the selected detected harmonics are in a selected frequency range to match the active tunable filter to the first vehicle component and the second vehicle component;
    receiving the filtered high-speed transmit signal at the second vehicle component; and
    monitoring in real time the filtered high-speed transmit signal at the second vehicle component and when the high-speed transmit signal changes, either repeating the adjusting of the active tunable filter or adjusting an operating behavior of the first vehicle component.

2. The method of claim 1, wherein the active tunable filter includes a first conductance and a second conductance, wherein the first and second conductances are in parallel, and wherein adjusting the active tunable filter includes changing the first conductance to zero during an off period of the duty cycle.

3. The method of claim 1, further comprising detecting noise and diagnosing harmonics in the transmit signal.

4. The method of claim 3, wherein detecting, diagnosing, adjusting, and filtering the signal occur while the vehicle is driving.

5. The method of claim 1, wherein the active tunable filter is one of a fifth order filter, a sixth order filter, and a greater than sixth order filter, and wherein adjusting the active tunable filter includes adjusting the selected frequency range.

6. The method of claim 1, wherein transmitting the transmit signal includes transmitting the transmit signal from an onboard memory to an onboard processor.

7. The method of claim 1, further comprising diagnosing and predicting a failure of the first component based on characteristics of the filtered signal.

8. The method of claim 7, further comprising modifying an operating behavior of the first vehicle component based on the harmonics detected in the transmit signal.

9. A system for real time filtering of signal transmissions in a vehicle, comprising:
    a first vehicle component configured to transmit a high-speed first signal including frequencies on the order of 10 gigahertz and higher;
    a signal sensor configured to detect harmonics in the first signal;
    an active tunable filter configured to filter out the detected harmonics,
    wherein the active tunable filter is adjustable to filter out a selected frequency range, wherein frequencies in the selected frequency range are filtered out of the first signal by the active tunable filter,
    wherein the active tunable filter includes a pulse generator having a duty cycle, and modulating a pulse wave signal to modify the duty cycle of the pulse generator causes modification of the selected frequency range, and
    wherein the active tunable filter is configured to receive the first signal and filter out selected detected harmonics in the selected frequency range and transmit a filtered signal; and
    a second vehicle component having an onboard processor is configured to receive the filtered signal, wherein the onboard processor is further configured to monitor the filtered signal in real time and adjust either the active tunable filter or an operating behavior of the first component during operation of the vehicle.

10. The system of claim 9, wherein the active tunable filter has a filter conductance, and wherein modifying the duty cycle of the pulse generator changes the filter conductance.

11. The system of claim 10, wherein the filter conductance includes a first conductance and a second conductance, wherein the first and second conductances are in parallel, and wherein during an off period of the duty cycle, the first conductance is zero.

12. The system of claim 9, wherein the first vehicle component and the active tunable filter are integrated into an integrated circuit onboard the vehicle.

13. The system of claim 9, wherein the signal sensor is further configured to detect noise in the first signal, and wherein the active tunable filter is further configured to filter out the noise.

14. The system of claim 13, wherein the active tunable filter is one of a fifth order filter, a sixth order filter, and a greater than sixth order filter.

15. The system of claim 9, wherein the first vehicle component is an onboard memory.

16. The system of claim 15, wherein the onboard processor is configured to diagnose failure of the onboard memory based on characteristics of the filtered signal.

17. The system of claim 9, wherein the signal sensor is configured to generate a detection signal, and wherein an operating behavior of the first vehicle component is modified based on the detection signal.

18. A device for real time filtering of high-speed signal transmissions between components in a vehicle comprising:
  a first component configured to transmit a first high-speed signal, wherein the first a high-speed transmit signal includes frequencies on the order of 10 gigahertz and higher;
  a second component configured to receive the first high-speed signal having an onboard processor;
  a signal sensor electrically coupled between the first component and the second component and configured to detect harmonics in the first signal;
  an active tunable filter electrically coupled between the signal sensor and the second component, the active tunable filter being configured to filter out the detected harmonics,
  wherein the active tunable filter is adjustable to modify a selected frequency range, wherein frequencies in the selected frequency range are filtered out of the first signal by the active tunable filter,
  wherein the active tunable filter includes a pulse generator having a duty cycle, and modulating a pulse wave signal to modify the duty cycle of the pulse generator modifies the selected frequency range, and
  wherein the active tunable filter is configured to receive the first signal to filter out selected detected harmonics in the selected frequency range and transmit a filtered signal to the second component; and
  the onboard processor of the second component to being configured to monitor the filtered signal during vehicle operation and detect a frequency drift over time and modify an operating behavior of the first component when the onboard processor detects the frequency drift.

19. The circuit board of claim 18, wherein the signal sensor is configured to generate a detection signal.

* * * * *